United States Patent
Chiang et al.

(10) Patent No.: US 7,852,302 B2
(45) Date of Patent: Dec. 14, 2010

(54) LIQUID CRYSTAL DISPLAY HAVING PIXEL UNITS EACH HAVING TWO SUB-PIXELS AND OPERATION METHOD THEREOF

(75) Inventors: Min-Feng Chiang, Hsin-Chu (TW); Hsueh-Ying Huang, Hsin-Chu (TW); Ming-Sheng Lai, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 756 days.

(21) Appl. No.: 11/745,663

(22) Filed: May 8, 2007

(65) Prior Publication Data
US 2008/0048999 A1   Feb. 28, 2008

(30) Foreign Application Priority Data
Aug. 25, 2006   (TW) .............................. 95131463 A

(51) Int. Cl.
G09G 3/36   (2006.01)
(52) U.S. Cl. .......................................... 345/93; 345/95
(58) Field of Classification Search .................. 345/50, 345/51, 55, 84, 87, 90, 92, 98, 100, 204
See application file for complete search history.

(56) References Cited

U.S. PATENT DOCUMENTS

| 5,648,793 | A * | 7/1997 | Chen ............................ 345/96 |
| 5,903,249 | A * | 5/1999 | Koyama et al. ................ 345/92 |
| 6,850,302 | B2 | 2/2005 | Song et al. |
| 7,071,911 | B2 * | 7/2006 | Inukai ........................... 345/92 |
| 7,283,109 | B2 * | 10/2007 | Koyama ........................ 345/76 |
| 7,535,448 | B2 * | 5/2009 | Hiroki .......................... 345/89 |
| 2003/0095223 | A1 | 5/2003 | Song et al. |
| 2005/0122441 | A1 | 6/2005 | Shimoshikiryoh |

FOREIGN PATENT DOCUMENTS

| CN | 1550854 | 12/2004 |
| CN | 1821842 | 8/2006 |
| TW | 240103 B | 9/2005 |
| TW | I322401 | 3/2010 |
| TW | I330746 | 9/2010 |

OTHER PUBLICATIONS

English language translation of abstract of TW 240103B.
S.S. Kim; "66.1: Invited Paper: The World's Largest (82-in) TFT-LCD;" SID 05 Digest; 2005; pp. 1842-1847.
English language translation of abstract of CN 1550854.
English language translation of abstract of CN 1821842.
English language translation of abstract of TW I322401 (published Mar. 21, 2010).
English language translation of abstract of TW I330746 (published Sep. 21, 2010).

* cited by examiner

Primary Examiner—Chanh Nguyen
Assistant Examiner—Pegeman Karimi
(74) Attorney, Agent, or Firm—Thomas, Kayden, Horstemeyer & Risley, LLP

(57) ABSTRACT

A pixel unit in the present invention is divided into two sub-pixels. Each sub-pixel includes a thin film transistor, a liquid crystal capacitor and a storage capacitor. The two transistors respectively located in different sub-pixels are connected to different scan lines. One of the two transistors is connected to the data line through another transistor. Therefore, two different pixel voltages are formed in a pixel.

15 Claims, 5 Drawing Sheets

LIQUID CRYSTAL DISPLAY HAVING PIXEL UNITS EACH HAVING TWO SUB-PIXELS AND OPERATION METHOD THEREOF

RELATED APPLICATIONS

This application claims priority to Taiwan Application Serial Number 95131463, filed Aug. 25, 2006, which is herein incorporated by reference.

FIELD OF THE INVENTION

The present invention relates to a liquid crystal display, and more particularly to a liquid crystal display with improved view angles.

BACKGROUND OF THE INVENTION

Liquid crystal displays have been used in various electronic devices. A Multi-Domain Vertically Aligned Mode (MVA mode) liquid crystal display is developed by Fujitsu in 1997 to provide a wider viewing range. In the MVA mode, a 160 degree view angle and a high response speed may be realized. However, when a user looks at this LCD from the oblique direction, the skin color of Asian people (light orange or pink) appears bluish or whitish from an oblique viewing direction. Such a phenomenon is called color shift.

The transmittance-voltage (T-V) characteristic of the MVA mode liquid crystal display is shown in FIG. 1. The vertical axis is the transmittance rate. The horizontal axis is the applied voltage. When the applied voltage is increased, the transmittance rate curve 101 in the normal direction is also increased. The transmittance changes monotonically as the applied voltage increases. In the oblique direction, the transmittance rate curve 102 winds and the various gray scales become the same. However, in the region 100, when the applied voltage is increased, the transmittance rate curve 102 is not increased. That is the reason to cause the color shift.

A method is provided to improve the foregoing problem. According to the method, a pixel unit is divided into two sub pixels. The two sub pixels may generate two different T-V characteristics. By combining the two different T-V characteristics, a monotonic T-V characteristic can be realized. The line 201 in FIG. 2 shows the T-V characteristic of a sub-pixel. The line 202 in FIG. 2 shows the T-V characteristic of another sub-pixel. By combining the two different T-V characteristics of line 201 and line 202, a monotonic T-V characteristic can be realized, as shown by the line 203 in FIG. 2.

Therefore, a pixel unit with two sub pixels and drive method thereof are required.

SUMMARY OF THE INVENTION

One object of the present invention is to provide a liquid crystal display with a wide view angle.

Another object of the present invention is to provide a pixel with two sub pixels.

One aspect of the present invention is directed to a liquid crystal display with a plurality of pixel units that may be driven by a drive wave to form two different pixel electrode voltages in a pixel unit.

Another aspect of the present invention is directed to a method for driving a liquid crystal display with a plurality of pixel units, wherein each pixel unit has two sub pixels.

Accordingly, the present invention provides a liquid crystal display, comprising: a plurality of data lines; a plurality of scan lines crossing said data lines, wherein said scan lines are grouped into a first group and a second group and are alternatively arranged, adjacent data lines and adjacent scan lines define a pixel; a plurality of common electrodes respectively located in corresponding pixels to divide pixels to first sub-pixels and second sub-pixels; a plurality of switching devices formed in the locations of the scan lines crossing the data lines, wherein part of the switching devices connected with the second group's scan line are connected to the first group's scan line and the other switching devices connected with the second group's scan line are located in corresponding first sub-pixels, and wherein the switching devices connected with the first group's scan line are located in corresponding second sub-pixels and are coupled to corresponding data line through the switching devices connected with the second group's scan line; and a plurality pixel electrodes connected to the switching devices respectively.

According to an embodiment, the liquid crystal display further comprises a data line drive integrated circuit for driving said data lines.

According to an embodiment, the liquid crystal display further comprises a scan line drive integrated circuit for driving said scan lines.

Accordingly, the present invention provides a liquid crystal display, comprising: a plurality of data lines; a plurality of scan lines crossing the data lines, wherein adjacent first and second data lines and adjacent first and second scan lines define a pixel, wherein each pixel comprises: a first pixel electrode; a second pixel electrode; a common electrode, wherein the common electrode and the first pixel electrode define a first sub-pixel and the common electrode and the second pixel electrode define a second sub-pixel; a first transistor located in the first sub-pixel, a gate electrode of the first transistor is connected to the first scan line, a first source/drain electrode of the first transistor is connected to the first data line and a second source/drain electrode of the first transistor is connected to the first pixel electrode; a second transistor located in the second sub-pixel, a gate electrode and a first source/drain electrode of the first transistor is connected to the second scan line and a second source/drain electrode of the first transistor is connected to the second pixel electrode; and a third transistor located between two adjacent pixel, a gate electrode of the third transistor is connected to the first scan line, a second source/drain electrode of the third transistor is connected to the second scan line and a first source/drain electrode of the third transistor is connected to the first data line, wherein the second transistor is coupled to the first data line through the third transistor.

According to an embodiment, the common electrode and corresponding pixel electrode form storage capacitor.

According to an embodiment, the embodiment provides a drive method for driving a liquid crystal display disclosed in the above, the method comprises: providing a first signal to the first scan line; providing a second signal to the second scan line, wherein a time difference exists between the first signal and the second signal; and providing two-step signals to the data lines sequentially, the two-step signal includes a first voltage signal and a second voltage signal, wherein the first voltage signal is written to the first sub-pixel through the first transistor when the first scan line is driven by the first signal, and the second voltage signal is written to the second sub-pixel through the second transistor and the third transistor when the first scan line is not driven and the second scan line is driven by the second signal and adjacent pixel's first scan line is driven by the first signal.

According to an embodiment, the time difference is equal to half width of the first signal.

According to an embodiment, the first signal and the second signal are pulse signals.

According to an embodiment, the first signal is a pulse signal and the second signal is a clock signal.

According to an embodiment, further comprises the second scan line is driven by pulse signal when the first scan line is driven by pulse signal.

According to an embodiment, further comprises the second scan line is driven by clock signal when the first scan line is driven by pulse signal.

Accordingly, a pixel unit in the present invention is divided into two sub-pixels. Each sub-pixel includes a thin film transistor, a liquid crystal capacitor and a storage capacitor. The two transistors respectively located in different sub-pixels are connected to different scan lines. One of the two transistors is connected to the data line through another transistor. Therefore, two different pixel voltages are formed in a pixel.

BRIEF DESCRIPTION OF THE DRAWINGS

The foregoing aspects and many of the attendant advantages of this invention are more readily appreciated and better understood by referencing the following detailed description, when taken in conjunction with the accompanying drawings, wherein.

DETAILED DESCRIPTION OF THE PREFERRED EMBODIMENT

Figure 1:
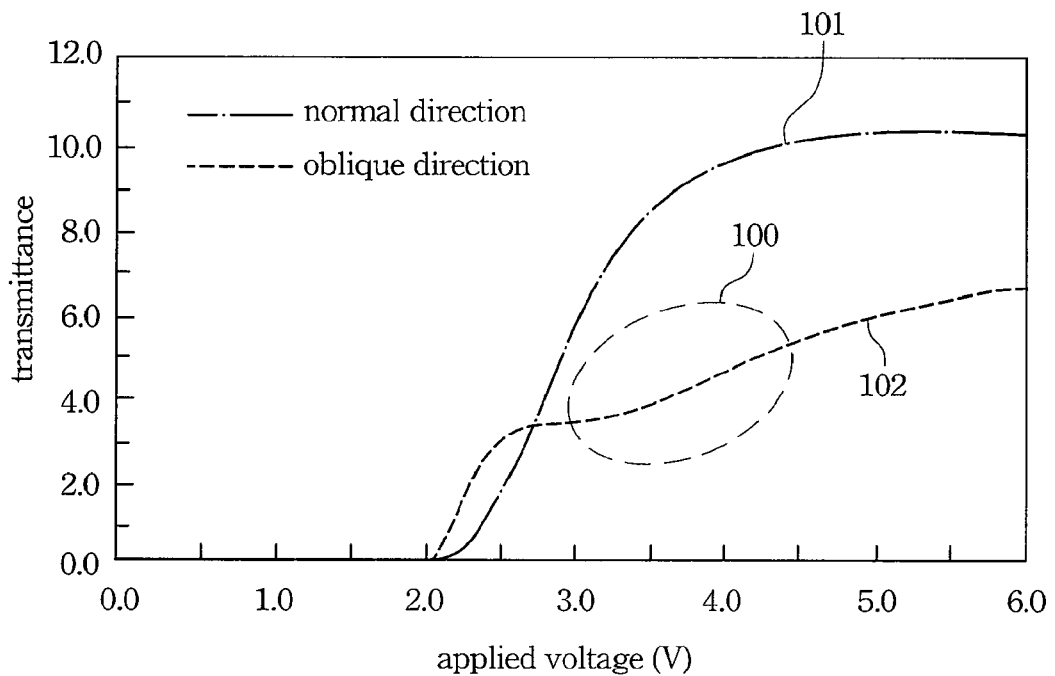
FIG. 1 and FIG. 2 illustrate the transmittance-voltage (T-V) characteristic of MVA mode liquid crystal display.
Figure 2:
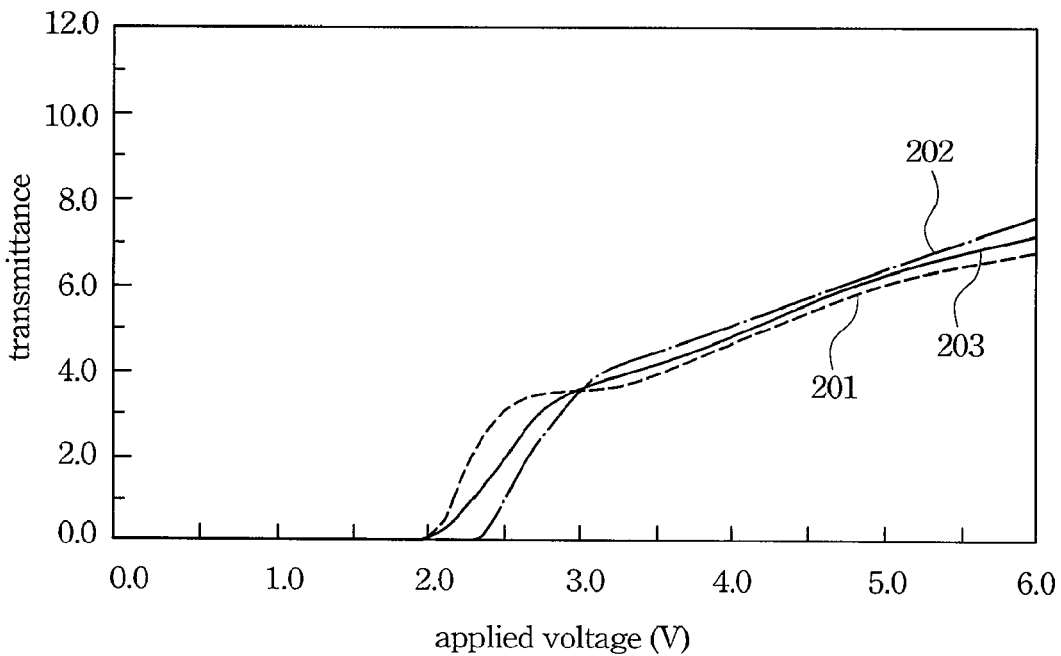
Figure 3A:
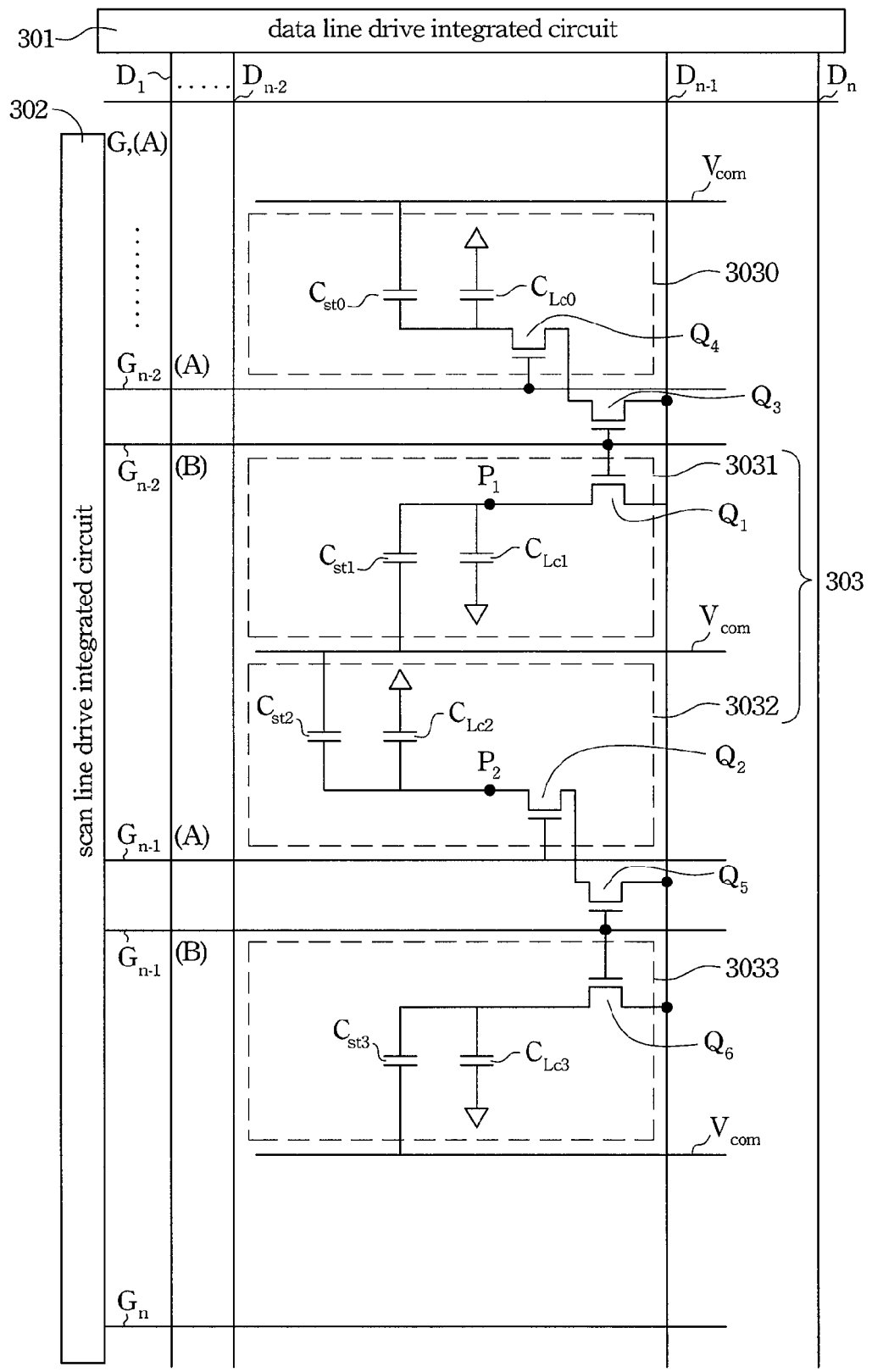
FIG. 3A illustrates a top view of a liquid crystal display according to the first embodiment of the present invention.

FIG. 3A illustrates a top view of a liquid crystal display according to the first embodiment of the present invention. The liquid crystal display is composed of data lines $D_1$, $D_2$, $D_3$, ..., $D_n$, the scan lines $G_1(A)$, $G_2(A)$, $G_3(A)$, ..., $G_n(A)$ of group A and the scan lines $G_2(B)$, $G_3(B)$, ..., $G_{n-1}(B)$ of group B. These scan lines are arranged in parallel to each other. Moreover, the scan lines of group A and the scan lines of group B are alternatively formed over a substrate (not shown in this figure).

The data lines and the scan lines are perpendicular to each other. Adjacent two data lines and adjacent two scan lines respectively belong to the group A and group B define a pixel unit. Each pixel includes a common electrode Vcom parallel to the scan line. According to the present invention, two transistors are connected to the scan line of group B located between adjacent two pixels to control the data of the data line to transfer to the corresponding pixel.

According to the present invention, a pixel includes two sub-pixels. Each sub-pixel includes a storage capacitor, a liquid crystal capacitor and a thin film transistor. The storage capacitor is composed of the pixel electrode and the common electrode. The liquid crystal capacitor is composed of the pixel electrode and the conductive electrode in the upper substrate (not shown in figure). The thin film transistor is formed in the location that the data line crosses the scan line.

According to the present invention, the transistors located in adjacent two sub-pixels are connected to adjacent two scan lines that belong to the group A and group B respectively. These two scan lines are connected together through a transistor that is controlled by this scan line of group B. A data line drive integrated circuit 301 is used to control the data lines $D_1$, $D_2$, $D_3$, ..., $D_n$. A scan line drive integrated circuit 302 is used to control the scan lines $G_1(A)$, $G_2(A)$, $G_3(A)$, ..., $G_n(A)$ of group A and the scan lines $G_2(B)$, $G_3(B)$, ..., $G_{n-1}(B)$ of group B.

The storage capacitors and the liquid crystal capacitors in the sub pixels described in the following are indicated by different symbols. Theses symbols are not related to their capacitance.

Figure 3B:
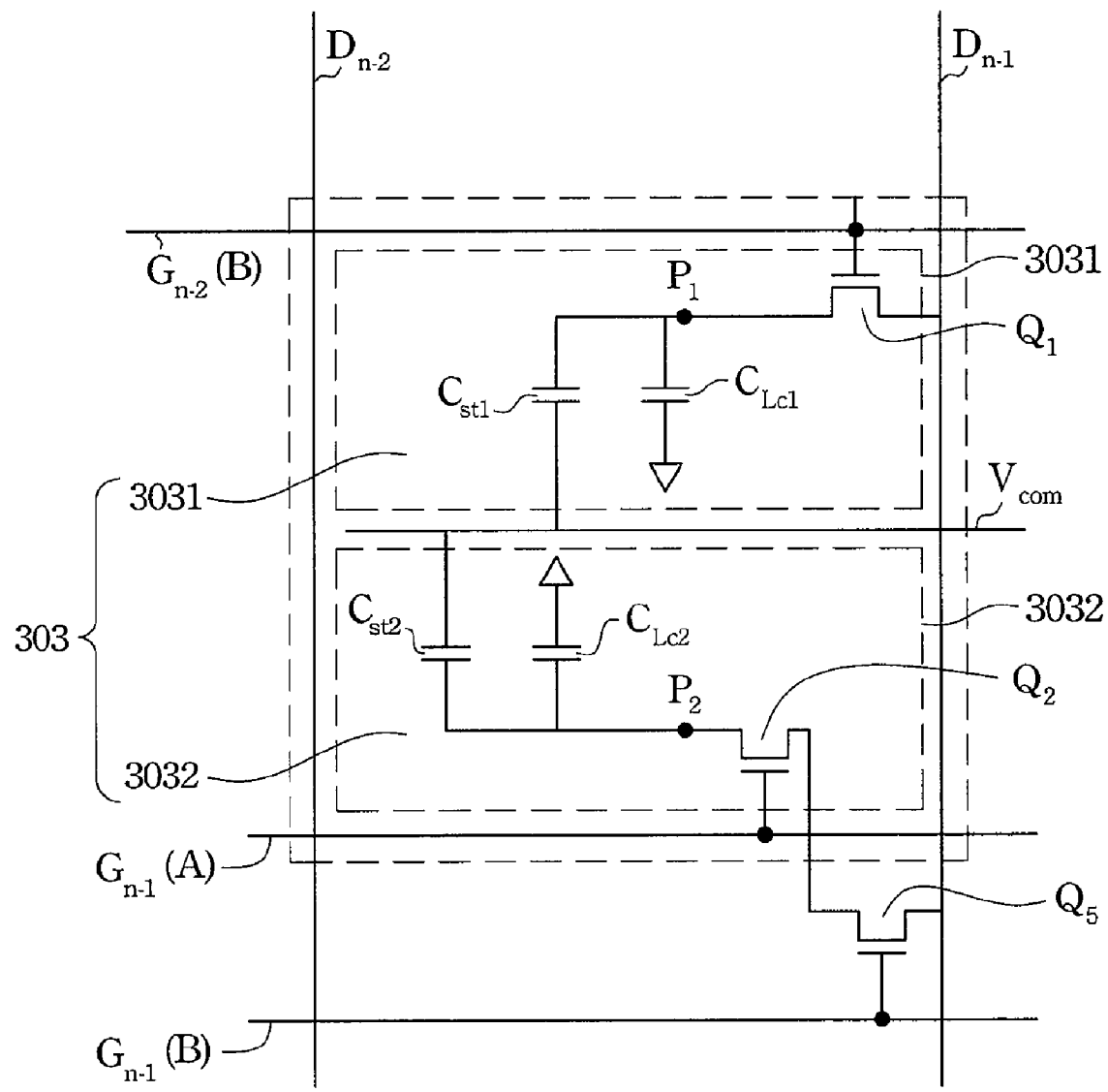
FIG. 3B illustrates an enlarged schematic diagram of a pixel unit according to an embodiment of the present invention.

FIG. 3B illustrates an enlarged diagram of a pixel. The pixel 303 is defined by the data lines $D_{n-2}$, $D_{n-1}$ and the scan lines $G_{n-2}(B)$, $G_{n-1}(A)$. A common electrode $V_{com}$ parallel to the scan line is arranged between the scan line $G_{n-2}(B)$ and the scan line $G_{n-1}(A)$. The pixel 303 is divided into two sub-pixels. The sub-pixel 3031 is located between the scan line $G_{n-2}(B)$ and the common electrode $V_{com}$. The sub pixel 3032 is located between the scan line $G_{n-1}(A)$ and the common electrode $V_{com}$.

The sub-pixel 3031 includes a transistor $Q_1$. According to the transistor $Q_1$, the gate electrode is connected to the scan line $G_{n-2}(B)$, the first source/drain electrode is connected to the data line $D_{n-1}$ and the second source/drain electrode is connected to the pixel electrode $P_1$. The storage capacitor $C_{st1}$ is composed of the pixel electrode $P_1$ and the common electrode $V_{com}$. The liquid crystal capacitor $C_{LC1}$ is composed of the pixel electrode $P_1$ and the conductive electrode in the upper substrate (not shown in figure).

The sub-pixel 3032 also includes a transistor $Q_2$. According to the transistor $Q_2$, the gate electrode is connected to the scan line $G_{n-1}(A)$, the first source/drain electrode is connected to the data line $D_{n-1}$ through another transistor $Q_5$ and the second source/drain electrode is connected to the pixel electrode $P_2$. The storage capacitor $C_{st2}$ is composed of the pixel electrode $P_2$ and the common electrode $V_{com}$. The liquid crystal capacitor $C_{LC2}$ is composed of the pixel electrode $P_1$ and the conductive electrode in the upper substrate (not shown in figure). In addition, according to the transistor $Q_5$, the gate electrode is connected to the scan line $G_{n-1}(B)$, the first source/drain electrode is connected to the data line $D_{n-1}$.

The transistors $Q_1$, $Q_2$ and $Q_5$ act as switches. When a scan voltage is applied to the gate electrode of a transistor, the data voltage in the data line is transferred to the second source/drain electrode and is written into the corresponding storage capacitor and the liquid crystal capacitor. In this invention, the transistor $Q_2$ is not directly connected to the data line $D_{n-1}$. This transistor $Q_2$ is connected to the data line $D_{n-1}$ through the transistor $Q_5$. In other words, the transistor $Q_2$ and the transistor $Q_5$ together control the sub-pixel 3032 whether or not to display the data in the data line. Therefore, when a data is written into the storage capacitor $C_{st2}$ and the liquid crystal capacitor $C_{LC2}$, the transistor $Q_2$ and the transistor $Q_5$ have to be conducted together. Accordingly, in the present invention, a voltage waveform in the scan line is used to control the transistors $Q_1$, $Q_2$ and $Q_5$ to co-operates with the voltage waveform in the data line to make the two sub-pixels 3031 and 3032 have different pixel voltages.

Figure 4A:
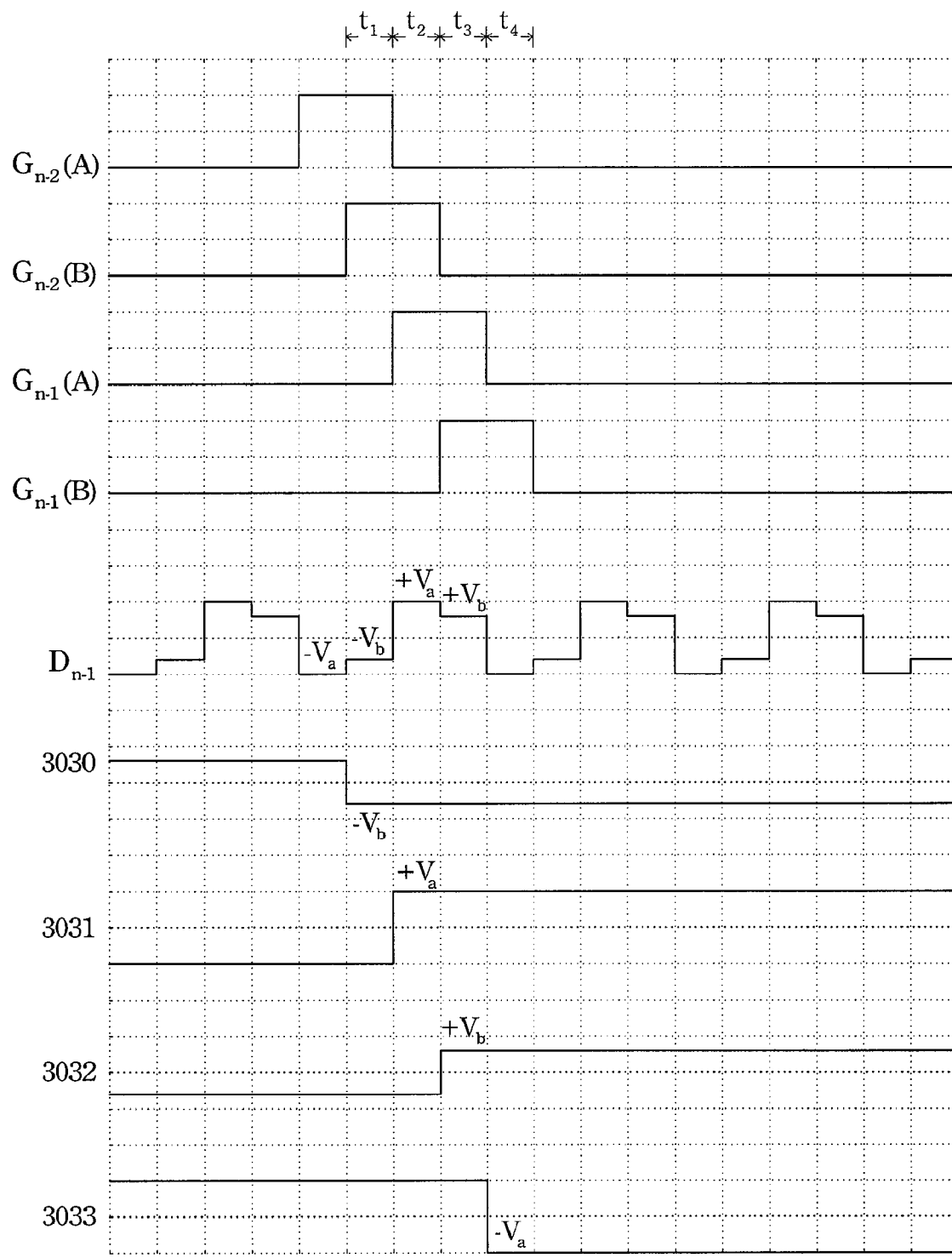
FIG. 4A illustrates a drive waveform and the corresponding electric voltage of four adjacent sub pixels according to an embodiment of the present invention.

FIG. 4A illustrates a drive waveform and the corresponding electric voltage of four adjacent sub pixels according to an embodiment of the present invention. The drive signal of each scan line is pulse. When scanning, drive signal is sequentially transferred to these scan lines. The time difference between the two drive signals transferred to adjacent scan lines respectively is half period of the pulse. In other words, the two drive signals transferred to adjacent scan lines respectively partially overlap. Therefore, in the time period of the two drive signals overlapping, the transistors connected with the two scan lines are turned on together.

In this embodiment, the drive waveform of the data line is a two steps drive waveform. The positive part of this drive waveform includes two drive voltage Va and Vb. The negative part of this drive waveform also includes two drive voltage −Va and −Vb. The absolute value of the drive voltage Va is larger than the absolute value of the drive voltage Vb.

Please refer to the FIG. 3A and FIG. 4A. During the time segment $t_1$, the voltage state of both the scan line $G_{n-2}(A)$ and $G_{n-2}(B)$ are in a high level state. The voltage state of both the scan line $G_{n-1}(A)$ and $G_{n-1}(B)$ are in a low level state. Therefore, the transistors $Q_1$, $Q_3$ and $Q_4$ are turned on and the transistors $Q_2$, $Q_5$ and $Q_6$ are turned off. In this case, the voltage −Vb in the data line $D_{n-1}$ may charge the liquid crystal capacitors $C_{LC0}$ and the storage capacitors $C_{st0}$ through the transistors $Q_3$ and $Q_4$. At this time, the sub-pixel 3030 may present the pixel voltage, −Vb. Moreover, the voltage −Vb in the data line $D_{n-1}$ may charge the liquid crystal capacitors $C_{LC1}$ and the storage capacitors $C_{st1}$ through the transistor $Q_1$. At this time, the sub-pixel 3031 may also present the pixel voltage, −Vb. The transistors $Q_2$, $Q_5$ and $Q_6$ are turned off. Therefore, the pixel voltage of the sub-pixels 3032 and 3033 is not changed. In this embodiment, the sub-pixel 3032 presents the pixel voltage, −Vb. The sub-pixel 3033 presents the pixel voltage, −Vb.

During the time segment $t_2$, the voltage state of both the scan line $G_{n-2}(B)$ and $G_{n-1}(A)$ are in a high level state. The voltage state of both the scan line $G_{n-2}(A)$ and $G_{n-1}(B)$ are in a low level state. Therefore, the transistors $Q_1$, $Q_2$ and $Q_3$ are turned on and the transistors $Q_4$, $Q_5$ and $Q_6$ are turned off. In this case, the voltage +Va in the data line $D_{n-1}$ may charge the liquid crystal capacitor $C_{LC1}$ and the storage capacitor $C_{st1}$ through the transistor $Q_1$. At this time, the sub-pixel 3031 may present the pixel voltage, +Va. The transistors $Q_4$, $Q_5$ and $Q_6$ are turned off. Therefore, the liquid crystal capacitors $C_{LC0}$, $C_{LC2}$ and $C_{LC3}$ and the storage capacitors $C_{St0}$, $C_{St2}$ and $C_{St3}$ coupling with the transistors $Q_4$, $Q_5$ and $Q_6$ respectively are not charged by the voltage +Va. At this time, the sub-pixel 3030, the sub-pixel 3032 and the sub-pixel 3033 still present the pixel voltage of the previous state. In other words, the sub-pixel 3030 presents the pixel voltage, −Vb. The sub-pixel 3032 presents the pixel voltage, −Vb. The sub-pixel 3033 presents the pixel voltage, +Va.

During the time segment $t_3$, the voltage state of both the scan line $G_{n-1}(A)$ and $G_{n-1}(B)$ are in a high level state. The voltage state of both the scan line $G_{n-2}(A)$ and $G_{n-2}(B)$ are in a low level state. Therefore, the transistors $Q_2$, $Q_5$ and $Q_6$ are turned on and the transistors $Q_1$, $Q_3$ and $Q_4$ are turned off. In this case, the voltage +Vb in the data line $D_{n-1}$ may charge the liquid crystal capacitor $C_{LC2}$ and the storage capacitor $C_{st2}$ through the transistors $Q_2$ and $Q_5$. At this time, the sub-pixel 3032 may present the pixel voltage, +Vb. On the other hand, the voltage +Vb in the data line $D_{n-1}$ may charge the liquid crystal capacitor $C_{LC3}$ and the storage capacitor $C_{st3}$ through the transistor $Q_6$. At this time, the sub-pixel 3033 may present the pixel voltage, +Vb. Because the transistors $Q_3$ and $Q_4$ are turned off, the liquid crystal capacitor $C_{LC0}$ and the storage capacitor $C_{St0}$ are not charged by the voltage +Vb. At this time, the sub-pixel 3030 still presents the pixel voltage, −Vb. On the other hand, because the transistor $Q_1$ is turned off, the liquid crystal capacitors $C_{LC1}$ and the storage capacitors $C_{st1}$ are not charged by the voltage +Vb. At this time, the sub-pixel 3031 still present the pixel voltage, +Va.

During the time segment $t_4$, the voltage state of the scan line $G_{n-1}(B)$ is in a high level state. The voltage state of both the scan line $G_{n-1}(A)$, $G_{n-2}(A)$ and $G_{n-2}(B)$ are in a low level state. Therefore, the transistors $Q_5$ and $Q_6$ are turned on and the transistors $Q_1$, $Q_2$, $Q_3$ and $Q_4$ are turned off. In this case, the voltage −Vb in the data line $D_{n-1}$ may charge the liquid crystal capacitor $C_{LC3}$ and the storage capacitor $C_{st3}$ through the transistor $Q_6$. At this time, the sub-pixel 3033 may present the pixel voltage, −Vb. Because the transistors $Q_3$ and $Q_4$ are turned off, the liquid crystal capacitor $C_{LC0}$ and the storage capacitor $C_{St0}$ are not charged by the voltage −Vb. At this time, the sub-pixel 3030 still presents a pixel voltage, −Vb. Because the transistor $Q_1$ is turned off, the liquid crystal capacitors $C_{LC1}$ and the storage capacitors $C_{St1}$ are not charged by the voltage −Vb. At this time, the sub-pixel 3031 still presents the pixel voltage, +Va. Because the transistor $Q_2$ is turned off, the liquid crystal capacitors $C_{LC2}$ and the storage capacitors $C_{St2}$ are not charged by the voltage −Vb. At this time, the sub-pixel 3032 still presents the pixel voltage, +Vb.

Accordingly, from the time segment $t_1$ to $t_4$, at least two pixel voltages, Vb and +Va, are presented in the pixel 303 together. Different pixel voltage may present different optical characteristics. Therefore, the color shift phenomenon may be eased by combining the two pixel voltages in a pixel.

Figure 4B:
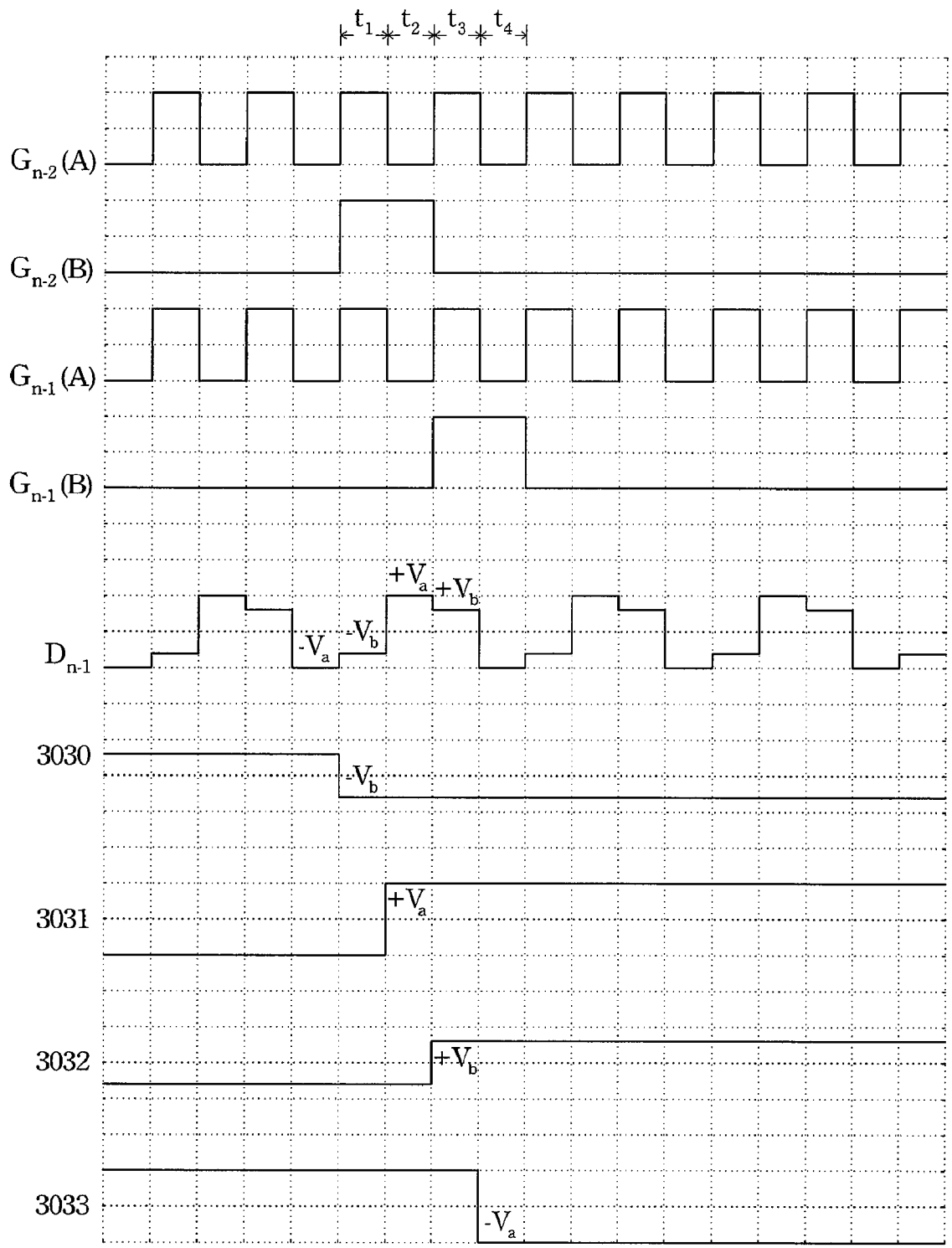
FIG. 4B illustrates a drive waveform and the corresponding electric voltage of four adjacent sub pixels according to another embodiment of the present invention.

FIG. 4B illustrates a drive waveform and the corresponding electric voltage of four adjacent sub pixels according to another embodiment of the present invention. The drive signal transferred in the scan line of the group A is a clock signal. The drive signal transferred in the scan line of the group B is pulse signal When scanning, pulse signal is sequentially transferred to these scan lines of the group B. The pulse width is equal to the period the clock signal. In other words, the two drive signals, the clock signal and the pulse signal, transferred to adjacent scan lines respectively partially overlap. Therefore, in the time period of the two drive signals overlapping, the transistors connected with the two scan lines are turned on together.

In this embodiment, the drive waveform of the data line is a two steps drive waveform. The positive part of this drive waveform includes two drive voltage Va and Vb. The negative part of this drive waveform also includes two drive voltage −Va and −Vb. The absolute value of the drive voltage Va is larger than the absolute value of the drive voltage Vb.

Please refer to the FIG. 3A and FIG. 4B. During the time segment $t_1$, the voltage state of the scan line $G_{n-1}(A)$, $G_{n-2}(A)$ and $G_{n-2}(B)$ are in a high level state. The voltage state of the scan line $G_{n-1}(B)$ is in a low level state. Therefore, the transistors $Q_1$, $Q_2$, $Q_3$ and $Q_4$ are turned on and the transistors $Q_5$ and $Q_6$ are turned off. In this case, the voltage −Vb in the data line $D_{n-1}$ may charge the liquid crystal capacitors $C_{LC0}$ and the storage capacitors $C_{st0}$ through the transistors $Q_3$ and $Q_4$. At this time, the sub-pixel 3030 may present the pixel voltage, −Vb. Moreover, the voltage −Vb in the data line $D_{n-1}$ may charge the liquid crystal capacitors $C_{LC1}$ and the storage capacitors $C_{st1}$ through the transistor $Q_1$. At this time, the sub-pixel 3031 may also present the pixel voltage, −Vb. The transistors $Q_5$ and $Q_6$ are turned off. The transistor $Q_2$ is connected to the data line $D_{n-1}$ through the transistors $Q_5$. Therefore, the liquid crystal capacitor $C_{LC2}$ and the storage capacitor $C_{St2}$ are not charged by the voltage −Vb. On the other hand, because the transistor $Q_6$ is turned off, the liquid crystal capacitors $C_{LC3}$ and the storage capacitors $C_{St3}$ are not charged by the voltage −Vb. Therefore, the sub-pixel 3032 and the sub-pixel 3033 still present the pixel voltage of the previous state. In this embodiment, the sub-pixel 3032 presents the pixel voltage, −Vb. The sub-pixel 3033 presents the pixel voltage, Va.

During the time segment $t_2$, the voltage state of both the scan line $G_{n-2}(B)$ is in a high level state. The voltage state of the scan lines $G_{n-1}(A)$, $G_{n-2}(A)$ and $G_{n-1}(B)$ are in a low level state. Therefore, the transistors $Q_1$ and $Q_3$ are turned on and the transistors $Q_2$, $Q_4$, $Q_5$ and $Q_6$ are turned off. In this case, the voltage +Va in the data line $D_{n-1}$ may charge the liquid crystal capacitor $C_{LC1}$ and the storage capacitor $C_{St1}$ through the transistor $Q_1$. At this time, the sub-pixel 3031 may present the pixel voltage, +Va. On the other hand, because the transistor $Q_4$ is turned off, the liquid crystal capacitor $C_{LC0}$ and the storage capacitor $C_{St0}$ are not charged by the voltage +Va. At this time, the sub-pixel 3030 still presents the previous pixel voltage state, −Vb. Because the transistor $Q_1$ and $Q_5$ are turned off, the liquid crystal capacitors $C_{LC2}$ and the storage capacitors $C_{St2}$ are not charged by the voltage +Va. At this time, the sub-pixel 3032 still present the previous pixel voltage state, −Vb. Because the transistor $Q_6$ is turned off, the liquid crystal capacitors $C_{LC3}$ and the storage capacitors $C_{St3}$ are not charged by the voltage +Va. At this time, the sub-pixel 3033 still present the previous pixel voltage state, +Va.

During the time segment $t_3$, the voltage state of the scan line $G_{n1}(A)$, $G_{n-2}(A)$ and $G_{n-1}(B)$ are in a high level state. The voltage state of the scan line $G_{n-2}(B)$ is in a low level state. Therefore, the transistors $Q_2$, $Q_4$, $Q_5$ and $Q_6$ are turned on and the transistors $Q_1$, $Q_3$ and are turned off. In this case, the voltage +Vb in the data line $D_{n-1}$ may charge the liquid crystal capacitor $C_{LC2}$ and the storage capacitor $C_{St2}$ through the transistors $Q_2$ and $Q_5$. At this time, the sub-pixel 3032 may present the pixel voltage, +Vb. On the other hand, the voltage +Vb in the data line $D_{n-1}$ may charge the liquid crystal capacitor $C_{LC3}$ and the storage capacitor $C_{St3}$ through the transistor $Q_6$. At this time, the sub-pixel 3033 may present the pixel voltage, +Vb. Because the transistors $Q_3$ and $Q_4$ are turned off, the liquid crystal capacitor $C_{LC0}$ and the storage capacitor $C_{St0}$ are not charged by the voltage +Vb. At this time, the sub-pixel 3030 still presents the pixel voltage, −Vb. On the other hand, because the transistor $Q_1$ is turned off, the liquid crystal capacitors $C_{LC1}$ and the storage capacitor $C_{St1}$ are not charged by the voltage +Vb. At this time, the sub-pixel 3031 still present the pixel voltage, +Va.

During the time segment $t_4$, the voltage state of the scan line $G_{n-1}(B)$ is in a high level state. The voltage state of both the scan line $G_{n-1}(A)$, $G_{n-2}(A)$ and $G_{n-2}(B)$ are in a low level state. Therefore, the transistors $Q_5$ and $Q_6$ are turned on and the transistors $Q_1$, $Q_2$, $Q_3$ and $Q_4$ are turned off. In this case, the voltage −Vb in the data line $D_{n-1}$ may charge the liquid crystal capacitor $C_{LC3}$ and the storage capacitor $C_{St3}$ through the transistor $Q_6$. At this time, the sub-pixel 3033 may present the pixel voltage, −Vb. Because the transistors $Q_3$ and $Q_4$ are turned off, the liquid crystal capacitor $C_{LC0}$ and the storage capacitor $C_{St0}$ are not charged by the voltage −Vb. At this time, the sub-pixel 3030 still presents the previous pixel voltage state, −Vb. Because the transistor $Q_1$ is turned off, the liquid crystal capacitors $C_{LC1}$ and the storage capacitors $C_{St1}$ are not charged by the voltage −Vb. At this time, the sub-pixel 3031 still presents the previous pixel voltage state, +Va. Because the transistor $Q_2$ is turned off, the liquid crystal capacitors $C_{LC2}$ and the storage capacitors $C_{St2}$ are not charged by the voltage −Vb. At this time, the sub-pixel 3032 still presents the previous pixel voltage state, +Vb.

Accordingly, from the time segment $t_1$ to $t_4$, at least two pixel voltages, Vb and +Va, are presented in the pixel 303 together. Different pixel voltage may present different optical characteristics. Therefore, the color shift phenomenon may be eased by combining the two pixel voltages in a pixel.

Accordingly, a pixel unit in the present invention is divided into two sub-pixels. Each sub-pixel includes a thin film transistor, a liquid crystal capacitor and a storage capacitor. The two transistors in a pixel are connected to different scan lines. One of the two transistors is connected to the data line through another transistor. Therefore, two different pixel voltages are formed in a pixel. The color shift phenomenon may be eased by combining the two pixel voltages in a pixel.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A drive method for driving a liquid crystal display, wherein said liquid crystal display comprises: a plurality of data lines; a plurality of scan lines crossing said data lines; a plurality of pixels defined by two neighboring data lines and two neighboring scan lines crossing the two neighboring data lines, wherein each pixel comprises: a first pixel electrode; a second pixel electrode; a common electrode, wherein said common electrode and said first pixel electrode define a first sub-pixel and said common electrode and said second pixel electrode define a second sub-pixel; a first transistor located in said first sub-pixel, a gate electrode of said first transistor is connected to said first scan line, a first source/drain electrode of said first transistor is connected to said first data line and a second source/drain electrode of said first transistor is connected to said first pixel electrode, wherein the first pixel electrode receives a data signal from the first data line through the first transistor; a second transistor located in said second sub-pixel, a gate electrode of said second transistor is connected to said second scan line and a second source/drain electrode of said second transistor is connected to said second pixel electrode; and a third transistor located between two adjacent pixel, a gate electrode of said third transistor is connected to said first scan line, a second source/drain electrode of said third transistor is connected to a first source/drain electrode of said second transistor and a first source/drain electrode of said third transistor is connected to said first data line, wherein said second transistor is coupled to said first data line through said third transistor, wherein the second pixel electrode receives a data signal from the first data line through the second transistor and the third transistor, said method comprises:

providing pulse signals to said scan lines sequentially, wherein a time difference exists between two pulse signals providing to adjacent scan lines; and providing two-step signals to said data lines sequentially, said two-step signal includes a first voltage signal and a second voltage signal, wherein said first voltage signal is written to said first sub-pixel through said first transistor when said first and second scan line are driven together, and said second voltage signal is written to said second sub-pixel through said second transistor and said third transistor when said first scan line is not driven and said second scan line and adjacent pixel's first scan line are driven.

2. The drive method of claim 1, wherein the time difference is equal to half of a width of the pulse signal.

3. The drive method of claim 1, wherein the value of said first voltage signal is larger than the value of said second voltage signal.

4. A drive method for driving a liquid crystal display, wherein said liquid crystal display comprises: a plurality of data lines; a plurality of scan lines crossing said data lines; a plurality of pixels defined by two neighboring data lines and two neighboring scan lines crossing the two neighboring data lines, wherein each pixel comprises: a first pixel electrode; a second pixel electrode; a common electrode, wherein said common electrode and said first pixel electrode define a first sub-pixel and said common electrode and said second pixel electrode define a second sub-pixel; a first transistor located in said first sub-pixel, a gate electrode of said first transistor is connected to said first scan line, a first source/drain electrode of said first transistor is connected to said first data line and a second source/drain electrode of said first transistor is connected to said first pixel electrode, wherein the first pixel electrode receives a data signal from the first data line through the first transistor; a second transistor located in said second sub-pixel, a gate electrode of said second transistor is connected to said second scan line and a second source/drain electrode of said second transistor is connected to said second pixel electrode; and a third transistor located between two adjacent pixel, a gate electrode of said third transistor is connected to said first scan line, a second source/drain electrode of said third transistor is connected to a first source/drain electrode of said second transistor and a first source/drain electrode of said third transistor is connected to said first data line, wherein said second transistor is coupled to said first data line through said third transistor, wherein the second pixel electrode receives a data signal from the first data line through the second transistor and the third transistor, said method comprises:
providing pulse signals to said scan lines sequentially, wherein a time difference exists between two pulse signals providing to adjacent scan lines; and
providing two-step signals to said data lines sequentially, said two-step signal includes a first voltage signal and a second voltage signal, wherein said first voltage signal is written to said first sub-pixel through said first transistor when said first scan line is driven, and said second voltage signal is written to said second sub-pixel through said second transistor and said third transistor when said first scan line is not driven and said second scan line and adjacent pixel's first scan line are driven.

5. The drive method of claim 4, wherein the time difference is equal to half of a width of the pulse signal.

6. The drive method of claim 4, wherein the value of said first voltage signal is larger than the value of said second voltage signal.

7. The drive method of claim 4, wherein said second scan line is driven when said first scan line is driven.

8. The drive method of claim 4, wherein said second scan line is not driven when said first scan line is driven.

9. A drive method for driving a liquid crystal display, wherein said liquid crystal display comprises: a plurality of data lines; a plurality of scan lines crossing said data lines; a plurality of pixels defined by two neighboring data lines and two neighboring scan lines crossing the two neighboring data lines, wherein each pixel comprises: a first pixel electrode; a second pixel electrode; a common electrode, wherein said common electrode and said first pixel electrode define a first sub-pixel and said common electrode and said second pixel electrode define a second sub-pixel; a first transistor located in said first sub-pixel, a gate electrode of said first transistor is connected to said first scan line, a first source/drain electrode of said first transistor is connected to said first data line and a second source/drain electrode of said first transistor is connected to said first pixel electrode, wherein the first pixel electrode receives a data signal from the first data line through the first transistor; a second transistor located in said second sub-pixel, a gate electrode of said second transistor is connected to said second scan line and a second source/drain electrode of said second transistor is connected to said second pixel electrode; and a third transistor located between two adjacent pixel, a gate electrode of said third transistor is connected to said first scan line, a second source/drain electrode of said third transistor is connected to a first source/drain electrode of said second transistor and a first source/drain electrode of said third transistor is connected to said first data line, wherein said second transistor is coupled to said first data line through said third transistor, wherein the second pixel electrode receives a data signal from the first data line through the second transistor and the third transistor, said method comprises:
providing a first signal to said first scan line;
providing a second signal to said second scan line, wherein a time difference exists between said first signal and said second signal; and
providing two-step signals to said data lines sequentially, said two-step signal includes a first voltage signal and a second voltage signal, wherein said first voltage signal is written to said first sub-pixel through said first transistor when said first scan line is driven by said first signal, and said second voltage signal is written to said second sub-pixel through said second transistor and said third transistor when said first scan line is not driven and said second scan line is driven by said second signal and adjacent pixel's first scan line is driven by said first signal.

10. The drive method of claim 9, wherein the time difference is equal to half of a width of the first signal.

11. The drive method of claim 9, wherein the first signal and the second signal are pulse signals.

12. The drive method of claim 11, wherein said second scan line is driven by pulse signal when said first scan line is driven by pulse signal.

13. The drive method of claim 9, wherein the first signal is a pulse signal and the second signal is a clock signal.

14. The drive method of claim 13, wherein said second scan line is driven by clock signal when said first scan line is driven by pulse signal.

15. The drive method of claim 9, wherein the value of said first voltage signal is larger than the value of said second voltage signal.

* * * * *